May 10, 1966 H. RUSKIN 3,250,339

SPRING BALANCE

Filed Jan. 13, 1965 4 Sheets-Sheet 1

INVENTOR.
HENRY RUSKIN
BY
*Paul S. Martin*
ATTORNEY

May 10, 1966  H. RUSKIN  3,250,339
SPRING BALANCE
Filed Jan. 13, 1965  4 Sheets-Sheet 2

INVENTOR.
HENRY RUSKIN
BY
Paul S. Martin
ATTORNEY

May 10, 1966  H. RUSKIN  3,250,339
SPRING BALANCE

Filed Jan. 13, 1965  4 Sheets-Sheet 3

INVENTOR.
HENRY RUSKIN
BY
Paul S. Martin
ATTORNEY

INVENTOR.
HENRY RUSKIN
BY
Paul S. Martin
ATTORNEY

United States Patent Office 3,250,339
Patented May 10, 1966

3,250,339
SPRING BALANCE
Henry Ruskin, Cranford, N.J., assignor to RDM Corporation, Cranford, N.J., a corporation of New Jersey
Filed Jan. 13, 1965, Ser. No. 425,237
7 Claims. (Cl. 177—234)

The present invention relates to spring balances, and to a method of assembling a bearing in proper relation to a pointer pivot.

An object of the present invention resides in providing a novel spring balance or "scale" having various advantages and novel features as will presently appear. To avoid ambiguity, the term "spring balance" is used to refer to the entire device, while the term "scale" is used to signify the sequence of markings traversed by an indicator or pointer.

A more particular object resides in providing a novel greatly simplified weighing mechanism wherein a long article such as a letter can be weighed without resort to a complicated suspension linkage for the article-support and without concern for the possibility of unsymmetrical distribution of weight on the article support.

A further object resides in the provision of a spring balance having a novel coupling mechanism between a vertically movable article support and a pointer that moves along a scale in a horizontal plane.

A still further object resides in the provision of a novel spring balance wherein the frictional effects incident to the opposing forces of the weight of the article being weighed and the restoring bias are at least largely excluded from the mechanism between the article support and the pointer; and more specifically in the inclusion of cam means in a spring balance for providing a desired form of calibration curve, wherein the friction which results from the opposing forces of the weight and the return-spring bias is isolated from the cam means. A related object resides in the provision of a novel spring balance in which the weight of the article being weighed is opposed by return spring-bias acting directly on the article support, and wherein the article support operates an efficient coupling mechanism to a pointer that operates in a horizontal plane.

The nature of the invention, including further objects, advantages and novel features will be more fully understood from the foregoing and from the detailed description below of a presently preferred embodiment incorporating the features of the invention. In that embodiment, by way of illustration, a balance bar is contained in a housing which also contains a pointer that moves along a horizontal scale and a coupling mechanism that transmits the movements of the balance bar to the pointer. Near its ends, the balance bar is supported by two compression coil springs; the bottom of each spring is held upright; the center of the balance bar carries a cam actuator that cooperates with a cam on a pivoted coupling plate adjacent the bar; and the coupling plate carries a gear sector that meshes at right angles with a gear sector on the pointer.

The mechanism converts vertical movements of the article support into horizontal deflections of the pointer. The pointer moves parallel to the base of the unit, and thus the device is compact and mechanically stable and has a long easily-read scale. In operation the places at which friction develops are isolated from the opposing forces represented by the weight of the article and the spring bias. The cam makes possible choice of various calibration curves, the preferred form of scale being expanded at the bottom of its range and (relatively) compressed at the top of its range.

The foregoing objects, features and advantages, and others will be recognized in the detailed description that follows, in which reference is made to the accompanying drawings forming part of the disclosure of the preferred embodiment.

Figure 1:
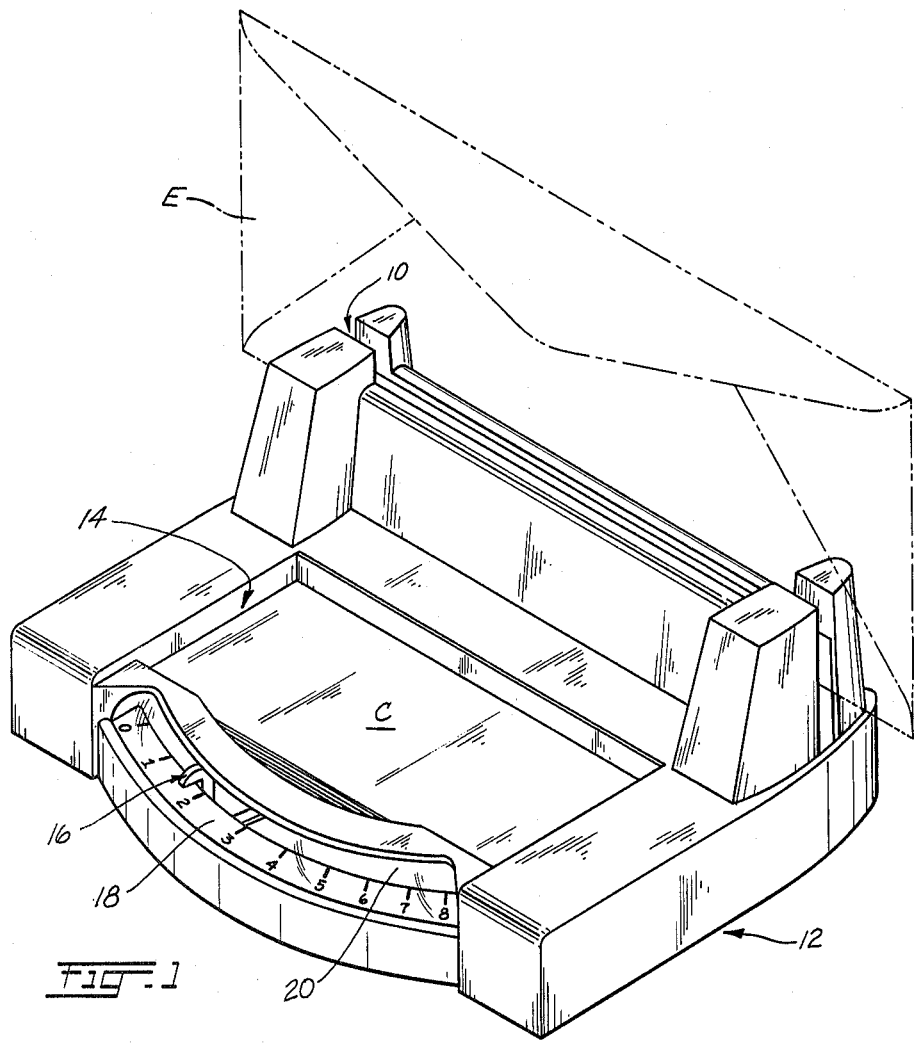
FIGURE 1 is a perspective view of the presently preferred embodiment of the invention, including in phantom an envelope in weighing position.

Referring now to FIG. 1, an envelope E is shown in phantom lines in a slot 10 in the upstanding rear part of housing 12, this housing being of unitary molded thermoplastic material. A receptacle 14 is incorporated in housing 12 for storing a supply of note paper or cards c in position for easy access. Below the bottom of this receptacle (see also FIG. 8) there is a movable pointer 16 that moves over scale 18. A transparent convex cover 20 is suitably secured in place over an elongated opening in housing 12 to protect pointer 16 and scale 18.

Figure 2:
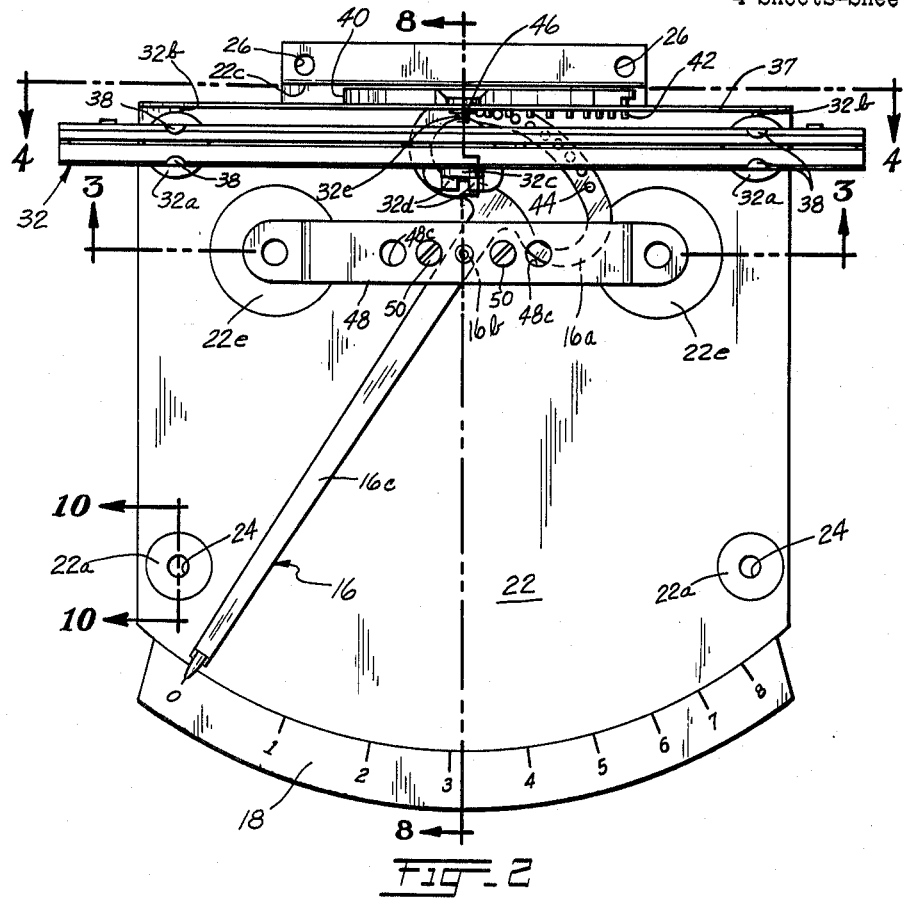
FIGURE 2 is a plan view of the embodiment in FIG. 1 with the molded housing removed to reveal the internal construction of the spring balance.
Figure 3:
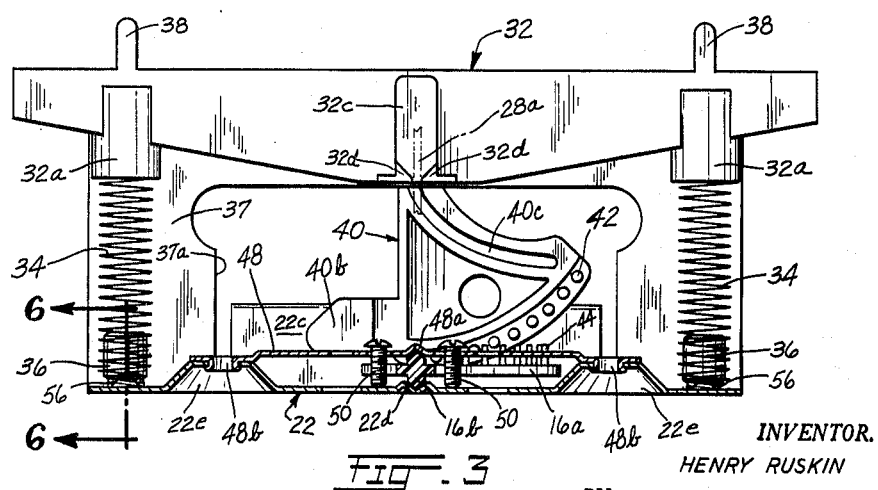
FIGURE 3 is a vertical cross-section of the apparatus of FIG. 2 as viewed from the plane 3—3 therein.
Figure 8:
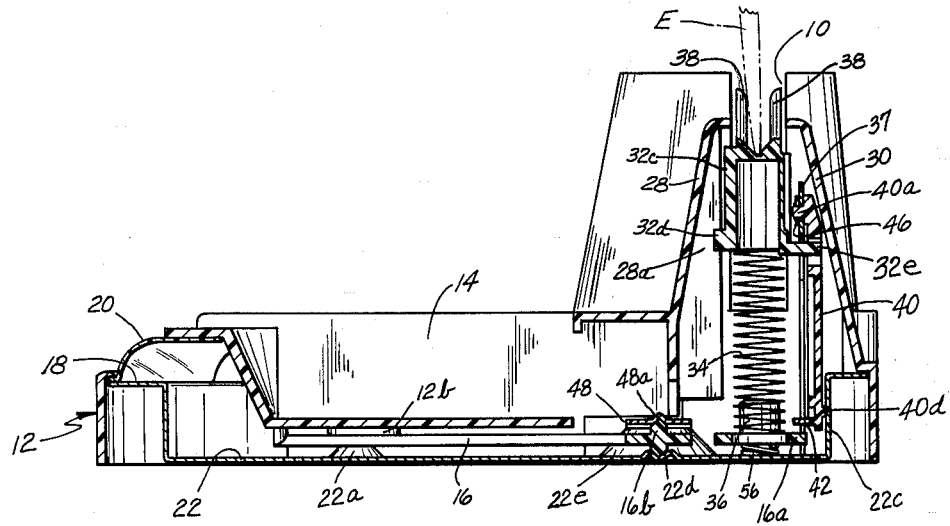
FIGURE 8 is a vertical cross-section of the apparatus along the section line 8—8 in FIG. 2, further including the molded housing of FIG. 1 and including in phantom a portion of an envelope in weighing position.
Figure 9:
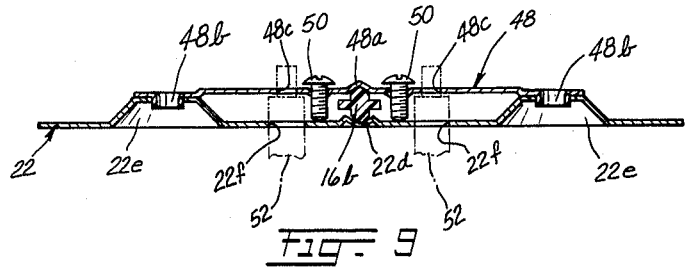
FIGURE 9 is a detail of FIG. 3 illustrating assembly and adjustment operations.
Figure 10:
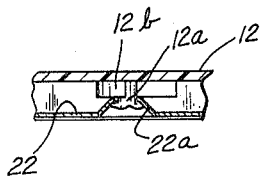
FIGURE 10 is a fragmentary vertical cross-section of part of the base in FIG. 2 as viewed from the section-line 10—10 therein, further including a portion of the housing in FIG. 1.

As best shown in FIG. 8, the molded housing 12 contains mechanism for weighing a letter or envelope E. This mechanism includes a main sheet-metal base 22. Housing 12 has integral rods 12a extending from integral stiffening ribs 12b and through holes 24 in base 22 (FIGS. 2 and 10). Rods 12a are headed as by pressure or by heat and pressure to retain housing 12 and base 22 in assembly as shown in FIG. 8. The portions 22a of base 22 that receive the headed rods 12a are conical so that the rod heads are recessed. Another pair of holes 26 (FIG. 2) are provided for additional rods (not shown) integral with the housing for securing the base and the housing together.

The slot 10 in housing 12 (FIG. 1) extends all along the upstanding structure extending along the rear of the housing. This rear structure includes a front wall 28 and a rear wall 30. A balance bar 32 contained between walls 28 and 30 has hollow cylindrical portions 32a which loosely receive the upper ends of compression coil-spring supports 34. Bar 32 is symmetrical about its midpoint, and portions 32a are equally spaced from the midpoint. Coil springs 34 thus share the weight of bar 32 equally. Veritical cylindrical metal plugs 36 secured to base 22 are received in coil springs 34 and hold those springs erect.

An upstanding back plate 37 extends integrally from base 22 and forms a guide surface for antifriction ribs 32b of parts 32a, and prevent rearward shift of bar 32. At the front of bar 32 at its center there is a flat-faced projection 32c that engages a centered vertical rib 28a extending integrally from wall 28, to prevent forward shift of bar 32. Projections 32d on bar 32 are spaced apart slightly more than the thickness of ribs 28a, and projections 32d flank rib 28a so as to locate bar 32 and prevent the bar from shifting endwise.

Bar 32 has small posts 38 to prevent excessive tilting of a letter to prevent rubbing of the letter against housing 12. Bar 32 is pressed down when a letter or envelope E is placed on it, and when the envelope is removed bar 32 moves upward. During the up-and-down movement of bar 32, plate 37 and rib 28a act as guides that constrain bar 32 against shifting forward and backward. During this up-and-down movement, rib 28a between projections 32d prevents endwise shift of bar 32; and because projections 32d are localized, vertically, and have no more than edge-contact with rib 28a, there is not constraint or binding action of projections 32d against rib 28 to interfere with the desired free up-and-down movement of bar 32.

Figure 4:
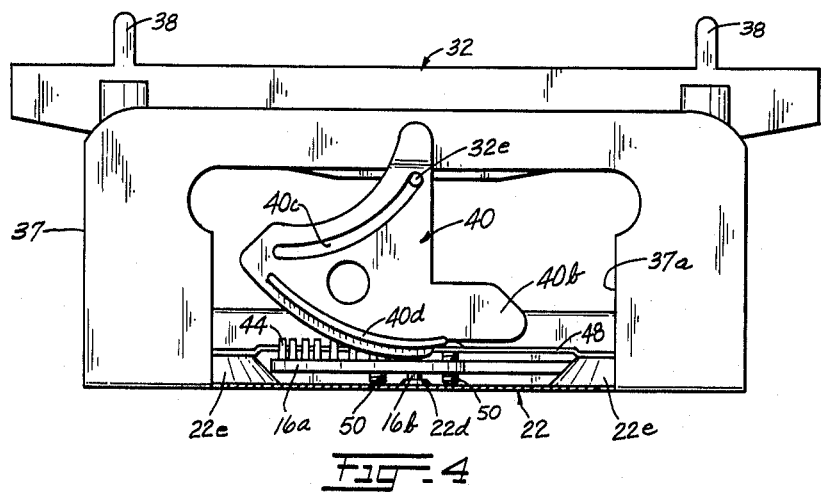
FIGURE 4 is a rear elevation of the apparatus of FIGS. 2 and 3 in the "zero" position of the parts.

A coupling element 40 has an integral horizontal pivot 40a through plate 37, and element 40 depends from pivot 40a for operation opposite an opening 37a. Part 16c and counterweight part 16a are balanced at opposite sides of crossed imaginary lines extending along the pointer and across the pointer through pivot 16b. Element 40 is balanced when in the position of FIG. 4, which is the "zero" position of the scale. While a portion of element 40 extends prominently to the left of center (the portion that carries gear pins 40a), element 40 also has a balancing portion 40b so that element 40 depends naturally from its pivot in the "zero" position of the spring balance.

Figure 5:
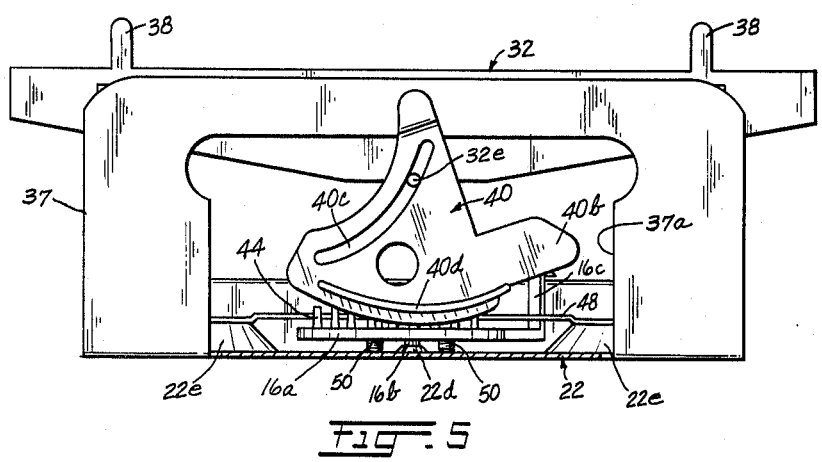
FIGURE 5 is a view like FIG. 4 with the parts deflected from "zero" as in a weighing operation.

A pin 32e extends rearward from bar 32 directly opposite the space between the confronting edges of projections 32d. Pin 32e is received in a contoured cam slot 40c. When pin 32e is moved down by bar 32, it moves straight down and it drives element 40 in a pivotal movement. Element 40 in turn operates pointer 16 through the coupling provided by gear sectors 42 and 44. Another effect of pin 32e moving down is to drive element 40 from its balanced position (FIG. 4) to one as in FIG. 5 in which it is unbalanced. In this position, the same edge of cam slot 40c that was driven by downward-moving pin 32e applies a gravity-induced bias against that pin. Consequently there is a tendency of unbalanced element 40 to restore element 40 and pointer 16 to "zero" when bar 32 rises. This restoring effect is accelerated and insured by coaction of pin 32e with the opposite edge of cam slot 40c, thus overcoming inertia of the parts and friction at pivot 16b and at meshed gear sectors 42 and 44.

Element 40 depends from pivot 40a, and it is constrained to remain in position for proper mesh of the gear sectors 42 and 44 by a flat upstanding part 22c of base 22 (FIG. 8) that confronts an antifriction raised portion 40d (FIGS. 4 and 8) of element 40. Raised portion 40d is of limited area, being a rib as shown or a series of raised dots. As another anti-friction detail, pivot 40a is formed as an integral rod extending from element 40 through plate 37 to a shoulder where the diameter of this rod is reduced. A washer 46 bears against this shoulder, and a headed portion of the pivot rod holds the washer in this position. The length of the rod from its base to its shoulder is made appreciably greater than the thickness of plate 37 in which this pivot rod 40a is received. This promotes economical and rapid assembly of the pivoted parts while insuring free movement at the pivotal connection.

The proper mounting of pivot 16b on base 22 is important to smooth operation of the scale, and a low-cost construction at this somewhat critical point is important to the practicality of the spring balance itself. As best shown in FIGS. 2, 3, 8 and 9, pivot 16b has upward and downward conical portions. A bridge 48 has a conical seat 48a that confronts and is vertically aligned with conical seat 22d in base 22. The total included angle of the conical pivot portions of pivot 16b may for example be 90° while that of the conical seats 22d and 48a may be 110°, in an example. At the center of each seat there is a rounded portion that engages tiny rounded end portions of the pivot. Pointer 16 including counterweight 16a, pivot 16b and gear-sector pins 44 is advantageously of one-piece molded plastic, so that the very ends of the pivot are inevitably conformed to the rounded portions of the conical seats by the bearing pressure.

Bridge 48 of metal has a pair of integral eyelets 48b which extend through holes in raised portions 22e and which are tightly curled over or set to fix bridge 48 in place. A pair of screws 50 are threaded through bridge 48. The sheet-metal parts 22 and 48 are normally spaced apart by a separation that would result in a strong binding or frictional force developing at pivot 16b; and this fictional force can be reduced to a bare minimum without introducing an objectionable amount of looseness at this pivot by adjusting screws 50. Bridge 48 resiliently presses screws 50 against base 22 in all normal adjusted positions of the screws.

It is important for pivot seat 48a to be located accurately in vertical alignment with pivot seat 22d. For this purpose, base 22 is provided with a pair of round alignment holes 22f at opposite sides of seat 22d, and bridge 48 has a pair of somewhat smaller round holes 48c at opposite sides of seat 48a. The center-to-center spacing of holes 48c equals that of holes 22f, and both sets of holes are accurately spaced (equally spaced, here) from the respective pivot seats. Advantageously this spacing is established and maintained in making many such bridges by using a composite tool for making the holes and the seat, and in like manner the seat and related holes in base 22 are formed concurrently. (Alternatively, the holes can be made first and used to locate the pivot-seat forming tool.) In assembling bridge 48 to base 22, a fixture is used (not shown) having parallel vertical rods 52 that have stepped diameters matching the diameters of holes 22f and 48c, and rods 52 have the same center-to-center spacing as the holes. Base 22 is put in place on the rods, pointer 16 is placed with its pivot on seat 22d, and bridge 48 is placed on pivot 16b, rods 52 automatically establishing the alignment of holes 22f with corresponding holes 48c and thereby aligning pivot seats 22d and 48d. At this time, the eyelets 48b have not yet been set, and their outer diameter is appreciably smaller than the related oversize holes in base 22. The eyelets are curled outward and set tightly against the lower surface of base portion 22e. This fixes the accurate alignment of pivot seats 22d and 48a, so that pointer 16 is movable across scale 18 with uniform spacing and without danger of rubbing friction.

The operation of the spring balance described above may now be reviewed. When an envelope E is placed on bar 32 it is maintained erect and out of contact with housing 12 by small posts 38 on bar 32. The applied weight depresses bar 32. The weight compresses both springs 34 equally if it is centered along the bar. Springs 34 are linear, giving progressively greater deflections in proportion to the applied weight. With this construction, even if the applied weight were carried more by one spring than the other, the downward deflection of the center of bar 32 would be the same as if the weight were centered. This can be more fully explained by first considering a letter on bar 32 that causes 1-inch compression of both springs, and then considering that the same letter has shifted along the bar so that the weight causes one spring to compress 1¼ inches. From this it will be apparent that the other spring would become less compressed, being then compressed ¾ inch. The result is that bar 32 slants and remains at the same level at its center between projections 32d. (It is here considered that, in becoming slanted, bar 32 does not transfer any appreciable part of its own weight from one spring to the other, and in view of the geometry of the parts and the lightness of bar 32, this assumption is true to a very close approximation.)

Depression of bar 32 causes pin 32e to travel straight downward, projections 32d being guided by rib 28a of the housing. Because the guide edges of projections 32d are aligned with pin 32e, pin 32e moves the same extent both when bar 32 is level and when it is slanted. Pin 32e in cam slot 40c operates depending element 40 and pointer 16, the extent of this motion being a function of the applied weight. Cam slot 40c is here shaped to provide expanded scale divisions near the bottom of its range, but it is apparent that virtually any desired distribution of scale markings can be realized by appropriately shaping cam slot 40c.

Figure 6:
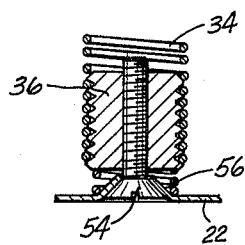
FIGURE 6 is an enlarged fragmentary vertical cross-section of parts in FIG. 3 as viewed from the section line 6—6 therein.

It will be recalled that springs 34 are held erect by plugs 36. As seen in FIG. 6, the external part of plug 36 has a helical groove whose pitch is much less than the helical pitch of spring 34. The effective or active length of the spring and its calibration can be adjusted by threading spring 34 down or up on plug 36. The height of plug 36 can also be adjusted by operating screw 54, and this is useful for setting pointer 16 accurately at "zero" on scale 18. Spring 56, a relatively stiff spring, lifts plug 36 away from base 22, as limited by the head of screw 56, and this screw resists turning of plug 36 due to vibrations.

Figure 7:
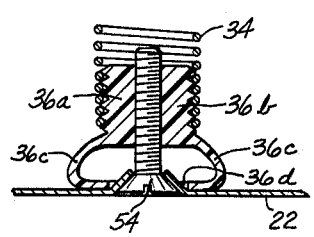
FIGURE 7 is a view like FIG. 6 showing modification.

In FIG. 7 there is shown a modification of the adjustment structure in FIG. 6. Two half-cylindrical parts 36a and 36b form part of a single one-piece molding. A strap 36c interconnects parts 36a and 36b, and has a hole 36d through it to accommodate the head of screw 54 and the conical formation of base 22 that receives the screw head. In FIG. 7, strap 36c takes the place of spring 56 in biasing parts 36a and 36b upward and in resisting unintended turning of threaded parts 36a and 36b.

Parts 16, 32 and 40 and the various portions as described above are molded as three plastic units, and these have a combined weight of slightly over one-half of an ounce. Further, some of that weight is counterbalanced, so that there is only a very small amount of "dead weight" in the mechanism that adds to the weight of the article being weighed. It will be understood that a large amount of dead weight in relation to the range of the spring balance would tend to reduce its sensitivity and accuracy.

From the foregoing it will be recognized that a novel spring balance has been produced having very few parts that are adapted to accurate yet economical assembly, and that the spring balance that is low in cost is nonetheless sensitive. Spring balances with ranges of 0–4 oz. and 0–8 oz. using the illustrated parts have been made.

While the foregoing represents an exemplary embodiment of the invention in its various aspects, it is evident that various modifications and varied application of the novel features will occur to those skilled in the art, and consequently the invention should be construed broadly in accordance with its full spirit and scope.

What is claimed is:

1. A spring balance, including an elongated balance bar having a pair of supporting helical compression coil springs adjacent the ends thereof, support means at the lower ends of said springs for holding each of said springs erect, cooperating guide means on said balance bar and adjacent thereto for preventing endwise shift of the balance bar, said cooperating guide means including a stationary vertical guide element and means on said balance bar having horizontally aligned edge portions cooperating with said vertical guide element so as to accommodate tilting movement of said bar, and indicating means cooperating with the middle of the balance bar and including a pointer and a scale for converting the vertical movements of the middle of the balance bar to weights of articles placed on the bar, said indicating means including an operative connection to the balance bar aligned with said edge portions of said cooperating guiding means.

2. A spring balance, including an arcuate scale in a horizontal plane, a pointer including an elongated indicator, a counterbalance part, and a vertical pivot disposed to guide movement of the indicator along the scale, an elongated balance bar for supporting an article to be weighed, said balance bar having two supporting compression springs adjacent the ends thereof, a vertical guide element adjacent said bar and centered between said supporting springs, localized guide means on said balance bar cooperating with said guide element for restraining the bar against endwise movement without interfering with vertical movement of the bar even when slanted, coupling element adjacent said balance bar having a cam slot therein and having a pivot whose axis is horizontal, a cam-driving element on said bar aligned with said localized guide means and received in said cam slot, and meshed gear teeth on said counterbalance part and said pivoted coupling element.

3. A spring balance including a supporting member for an article to be weighed, means carrying said supporting member for vertical movement and means biasing said supporting member upward to a normal "zero" position, a coupling member adjacent said supporting member having a horizontal pivot, said article supporting member and said coupling member having a cam slot and a driving pin cooperating therewith and arranged to operate said coupling member about said horizontal pivot in response to vertical movement of said article supporting member, a weight indicating horizontally disposed scale, a pointer having a vertical pivot operable along said scale, and meshed gear sectors on said coupling member and said pointer for operating said pointer along said scale in response to vertical movement of said article supporting member.

4. A spring balance having a weight indicating scale and a pointer operable along said scale, a movable article-supporting element, means coupling said pointer and said article supporting element for coordinated movement, and biasing means for maintaining said article-supporting element in an initial position and for affording article-weighing displacement of said article-supporting element, said pointer having oppositely directed conical pivot points, and said spring balance including a sheet-metal base member and a sheet-metal bridge member, each of said members having a conical seat for one of said pivot points and having a pair of alignment holes accurately located in relation to said conical seat thereof, the holes of one of said members being aligned with the holes of the other of said members when said conical seats are aligned, and means securing said bridge member to said base member including a pair of integral eyelets on one said member and a pair of holes in the other of said members receiving said eyelets but said holes being oversize relative to said eyelets to a limited extent to allow for adjusting movement of said conical seats and said alignment holes, said eyelets being firmly set with said seats accurately aligned with each other.

5. A spring balance, including an elongated balance bar having a pair of supporting helical compression coil springs adjacent the ends thereof, support means at the lower ends of said springs for holding each of said springs erect, cooperating means on said bar and adjacent thereto midway between said springs for guiding the vertical movements of the middle of the balance bar without preventing endwise tilting, and indicating means cooperating with the middle of the balance bar and including a pointer and a scale for converting the vertical movements of the middle of the balance bar to weights of articles placed on the bar, said support means at the lower ends of said springs including a pair of helically grooved parts receiving a sequence of convolutions of said springs, respectively, for adjusting the active lengths of said springs, and individual means for supporting each of said helically grooved parts and the springs thereon at respective vertically adjustable positions for adjusting said pointer at zero when no weight is on the balance bar.

6. A spring balance, including an elongated balance bar having a pair of supporting helical compression coil springs adjacent the ends thereof, support means at the lower ends of said springs for holding each of said springs erect, cooperating means on said bar and adjacent thereto midway between said springs for guiding the vertical movements of the middle of the balance bar without preventing endwise tilting, and indicating means cooperating with the middle of the balance bar and including a pointer and a scale for converting the vertical movements of the middle of the balance bar to weights of articles placed on the bar, said scale being disposed in a horizontal plane and said pointer having a vertical pivot disposed to guide movement of the pointer along the scale, and said converting mechanism including a first gear sector operably coupled to the middle of the balance bar and having a horizontal pivotal axis, said converting mechanism further including a second gear sector carried by said pointer for operation in a horizontal plane, said gear sectors being in mesh.

7. A spring balance, including an elongated balance bar having a pair of supporting helical compression coil springs adjacent the ends thereof, support means at the lower ends of said springs for holding each of said springs erect, cooperating means on said bar and adjacent thereto midway between said springs for guiding the vertical movements of the middle of the balance bar without preventing endwise tilting, and indicating means cooperating with the middle of the balance bar and including a pointer and a scale for converting the vertical movements of the middle of the balance bar to weights of articles placed on the bar, said indicating means including a driving pin on said balance bar and a cooperating cam for providing relatively expanded and compressed scale readings at the different parts of the scale range.

References Cited by the Examiner

UNITED STATES PATENTS

| 1,928,065 | 9/1933 | Litle | 177—234 X |
| 2,751,215 | 6/1956 | Weckerly | 177—234 X |

FOREIGN PATENTS

| 519,432 | 5/1953 | Belgium. |
| 201,552 | 4/1924 | Great Britain. |
| 65,842 | 11/1955 | France. |

LEO SMILOW, *Primary Examiner.*

G. S. PORTER, *Assistant Examiner.*